United States Patent [19]

Carlson

[11] Patent Number: 5,711,746
[45] Date of Patent: Jan. 27, 1998

[54] PORTABLE CONTROLLABLE FLUID REHABILITATION DEVICES

[75] Inventor: J. David Carlson, Cary, N.C.

[73] Assignee: Lord Corporation, Cary, N.C.

[21] Appl. No.: 613,704

[22] Filed: Mar. 11, 1996

[51] Int. Cl.$^6$ ..................................................... A63B 21/008
[52] U.S. Cl. ............................... 482/112; 482/5; 482/44; 482/79; 482/903
[58] Field of Search ............................... 600/9, 10, 13, 600/14, 15; 601/15, 17, 23, 40, 55, 33–35; 482/4, 5, 8, 44, 49, 79, 80, 111, 903, 112

[56] References Cited

U.S. PATENT DOCUMENTS

| | | |
|---|---|---|
| 2,664,886 | 1/1954 | Coffman . |
| 2,832,334 | 4/1958 | Whitelaw . |
| 3,976,057 | 8/1976 | Barclay . |
| 4,474,176 | 10/1984 | Farris et al. . |
| 4,801,138 | 1/1989 | Airy et al. . |
| 4,899,735 | 2/1990 | Townsend et al. . |
| 5,052,379 | 10/1991 | Airy et al. . |
| 5,067,479 | 11/1991 | Saringer et al. . |
| 5,090,138 | 2/1992 | Borden . |
| 5,116,296 | 5/1992 | Watkins et al. . |
| 5,144,943 | 9/1992 | Luttrell et al. . |
| 5,209,715 | 5/1993 | Walker et al. ............... 482/113 |
| 5,215,508 | 6/1993 | Bastow . |
| 5,277,281 | 1/1994 | Carlson et al. . |
| 5,284,330 | 2/1994 | Carlson et al. . |
| 5,286,242 | 2/1994 | Johnston . |
| 5,297,540 | 3/1994 | Kaiser et al. . |
| 5,337,737 | 8/1994 | Rubin et al. . |
| 5,353,839 | 10/1994 | Kordonsky et al. . |
| 5,382,373 | 1/1995 | Carlson et al. . |
| 5,383,826 | 1/1995 | Michael . |
| 5,398,917 | 3/1995 | Carlson et al. . |
| 5,409,435 | 4/1995 | Daniels ......................... 482/53 |
| 5,425,690 | 6/1995 | Chang . |
| 5,452,745 | 9/1995 | Kordonsky et al. . |
| 5,454,773 | 10/1995 | Blanchard et al. . |
| 5,460,585 | 10/1995 | Gentry et al. . |
| 5,472,410 | 12/1995 | Hamersly . |
| 5,472,412 | 12/1995 | Knoth . |
| 5,476,441 | 12/1995 | Durfee et al. . |

OTHER PUBLICATIONS

Carlson et al.; MR Fluid Devices and Process of Controlling Force in Exercise Equipment Utilizing Same; S/N—08/304,005.

Weiss et al.; High Strength Magneto– and Electro–rheological Fluids; SAE 932451 Sep. 13, 1993.

Carlson et al.; Commercial Magneto–rheolgical Fluid Devices; Jul. 1995.

Lord Corporation; Rheonetic™ Systems: A New Dimension in Vibration Control; Brochure Aug. 1994.

Lord Corporation; VersaFlo™ Controllable Fluids; Brochure PL01–2000A.

Hammacher Schlemmer Catalog Advertisement; Late Winter 1996.

*Primary Examiner*—Jeanne M. Clark
*Attorney, Agent, or Firm*—Randall S. Wayland; James W. Wright

[57] ABSTRACT

A portable controllable fluid device (20a) for rehabilitation of injured limbs, appendages and joints (33a). The rehabilitation device (20a) includes a first bracket (22a) for fixedly securing to a first body part, such as a lower leg (25), a second bracket (24a) for fixedly securing to a second body part, such as a foot (26), and a controllable fluid brake (27a) such as a magnetorheological fluid brake including a magnetorheological fluid contained therein having a carrier fluid and disbursed magnetic particles, attached between the first bracket (22a) and second bracket (24a). The controllable fluid brake (27a), preferably acts in a rotary fashion and provides resistive forces about an axis adjacent said body joint (33a) to exercise the muscles upon movement of said first bracket (22a) relative to said second bracket (24a) resulting from movement of the user's first body part relative to the second body part. The device (20a) is portable and can be used to rehabilitate, for example, a wrist, elbow, knee or ankle joint in the user's home. The device (20a) allows variable adjustment of the level of resistance felt by the rehabilitating user by adjusting a controller (28a). In another embodiment, feedback information is used to control the level of resistance according to a predetermined force/torque profile(s). A potentiometer (53d) provides the feedback information regarding position to the controller (28a).

11 Claims, 7 Drawing Sheets

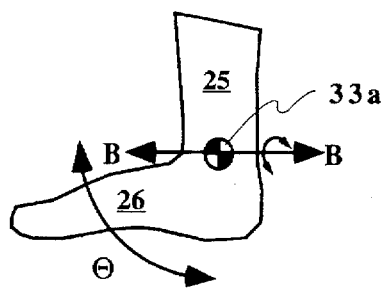
Fig. 1a
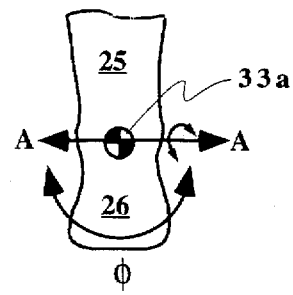
Fig. 1b
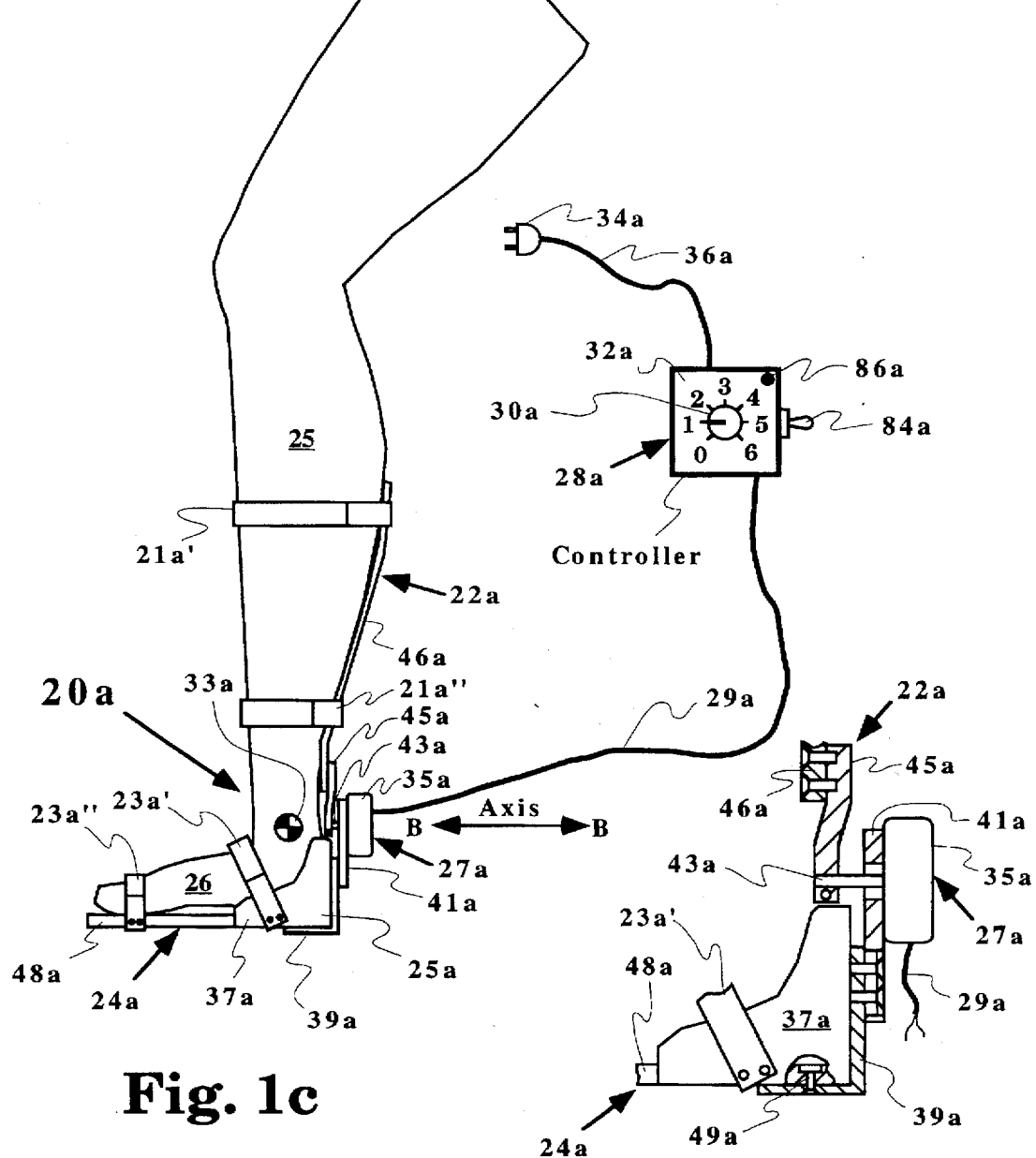
Fig. 1c
Fig. 1d

PORTABLE CONTROLLABLE FLUID REHABILITATION DEVICES

FIELD OF THE INVENTION

The present invention relates to certain devices which are useful in rehabilitation of injured limbs and appendages. More specifically, the present invention relates to controllable devices for rehabilitation use.

BACKGROUND OF THE INVENTION

Joint mobility dysfunction or contractures may develop as a result of injury, surgeries, vascular or neurological problems, illness or the like. For rehabilitation of such dysfunctional joints, etc., physical therapy is required. The therapist generally uses manipulation and heat therapy to improve mobility of the joint. Notably, these types of injuries require multiple visits to the therapist with the associated significant investments of time and expense. Therefore, there is a recognized need for a portable device for providing therapeutic exercise to dysfunctional joints and the like which can be used in the home by the person requiring rehabilitation. Devices are needed for rehabilitation of joints such as the wrist, elbow, shoulder, hip, knee, and ankle.

Devices are generally known for rehabilitation of joints and limbs. U.S. Pat. No. 5,472,410 to Hamersly teaches an adjustable Flexion and Extension Orthoses where springs provide the forces for rehabilitation of joints such as elbows and knees. U.S. Pat. No. 5,425,690 to Chang provides a spring-driven wrist exerciser. U.S. Pat. No. 5,337,737 to Rubin et al. describes a dynamic Orthosis with proportional resistance. U.S. Pat. No. 5,297,540 to Kaiser et al. describes a Continuous Passive Motion (CPM) Orthosis for providing repeated oscillatory-driven motion, by way of a motor, to rehabilitate a joint.

U.S. Pat. No. 5,215,508 describes an ankle and stabtalar joint rehabilitation device including pneumatic or hydraulic dampers for exercising the dorsal and plantar flexion as well as the inversion and eversion flexion. U.S. Pat. No. 5,116,296 to Watkins et al. describes an ergometer for isometrically exercising a joint such as a knee. A closed-loop feedback control is described with reference to FIG. 8 which includes stimulating a muscle to provide a desired force which coincides with a command force. Strain gages are used to measure the desired force.

U.S. Pat. No. 5,052,379 to Airy et al. describes a combination brace and wearable exercise apparatus for body joints which includes a replaceable load or resistive means of the viscous type which impart a desired level of resistance. U.S. Pat. No. 4,801,138 to Airy et al. describes a wearable apparatus for exercising body parts which includes a belt-driven viscous device. U.S. Pat. No. 5,472,412 to Knoth describes a limb brace with a hydraulic resistance unit. Notably, none of these devices provide a compact and portable and controllable arrangement for providing rehabilitation to a patients joints or limbs.

U.S. Patent Application Serial No. 08/304,005 to Carlson and Catanzarite entitled "Magnetorheological Fluid Devices and Process of Controlling Force in Exercise Equipment Utilizing Same" describes a rotary brake and use in various exercise machines. Magnetorheological fluids are described in detail in commonly assigned U.S. Pat. No. 5,382,373 to Carlson and Weiss entitled "Magnetorheological Materials based Upon Alloy Particles." Further discussion of Magnetorheological fluids and devices are provided in SAE paper No. 932451 entitled "High Strength Magneto- and Electro-Rheological Fluids" authored by Weiss, Duclos, Carlson, Chrzan and Margida and a paper presented at the 5th Int. Conf. on Electro-Rheological, Magneto-Rheologiucal Suspensions and Associated Technology by Carlson, Catanzarite and St. Clair, entitled "Commercial Magnetorheological Fluid Devices."

SUMMARY OF THE INVENTION

The present invention is a portable controllable fluid rehabilitation device for providing resistive forces for rehabilitative exercise of muscles acting between a first body part and a second body part which are spaced o n either side of a body joint, comprising a first bracket having means for fixedly securing to said first body part, a second bracket having means for fixedly securing to said second body part and a controllable fluid brake attached between said first bracket and said second bracket. The controllable fluid brake provides resistance forces which may be varied about a defined axis adjacent said body joint to exercise said muscles upon movement of said first bracket relative to said second bracket. The brake preferably is a rotary magnetorheological fluid brake which contains therein a carrier fluid and dispersed magnetic particles. Also, preferably, the device includes a controller whereby the user can adjust the level of resistance experienced. In another aspect, the resistance forces may be varied according to a predetermined profile as a function of position. The position feedback information is, preferably, derived from a potentiometer or other rotary sensor, such as a rotary encoder.

The abovementioned and further details and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1a is a side view of a foot illustrating flexion of the ankle joint about a primary axis A—A (shown in FIG. 1b);

FIG. 1b is a back view of a foot illustrating flexion of the ankle joint about an Inversion/Eversion axis B—B (shown in FIG. 1a);

FIG. 1c is a side view of a first embodiment of a portable controllable fluid rehabilitation device shown attached between a patient's leg and foot for rehabilitation of the ankle joint about the Inversion/Eversion axis;

FIG. 1d is an enlarged side view of the details of the first embodiment of a portable controllable fluid rehabilitation device;

FIG. 2b is a top view of the embodiment of portable controllable fluid rehabilitation device shown in FIG. 2a;

DETAILED DESCRIPTION OF THE INVENTION

Figure 1E:
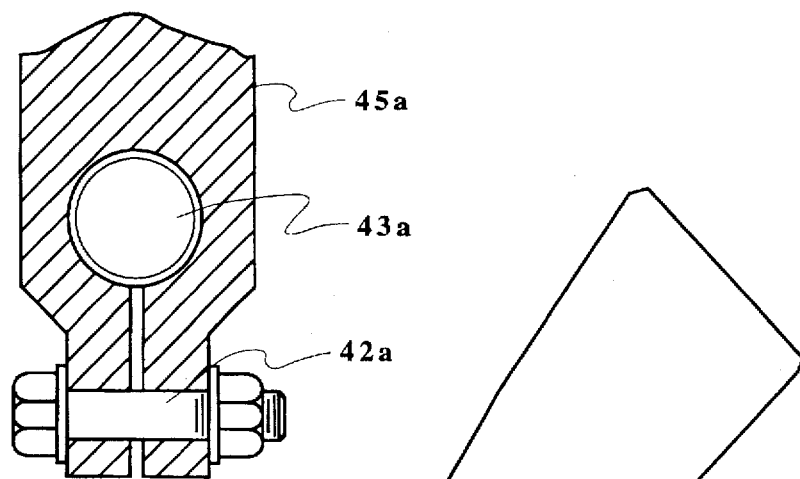
FIG. 1e is an enlarged end view of the details of the clevis bracket for securing the first bracket to the shaft of the controllable fluid brake.
Figure 1F:
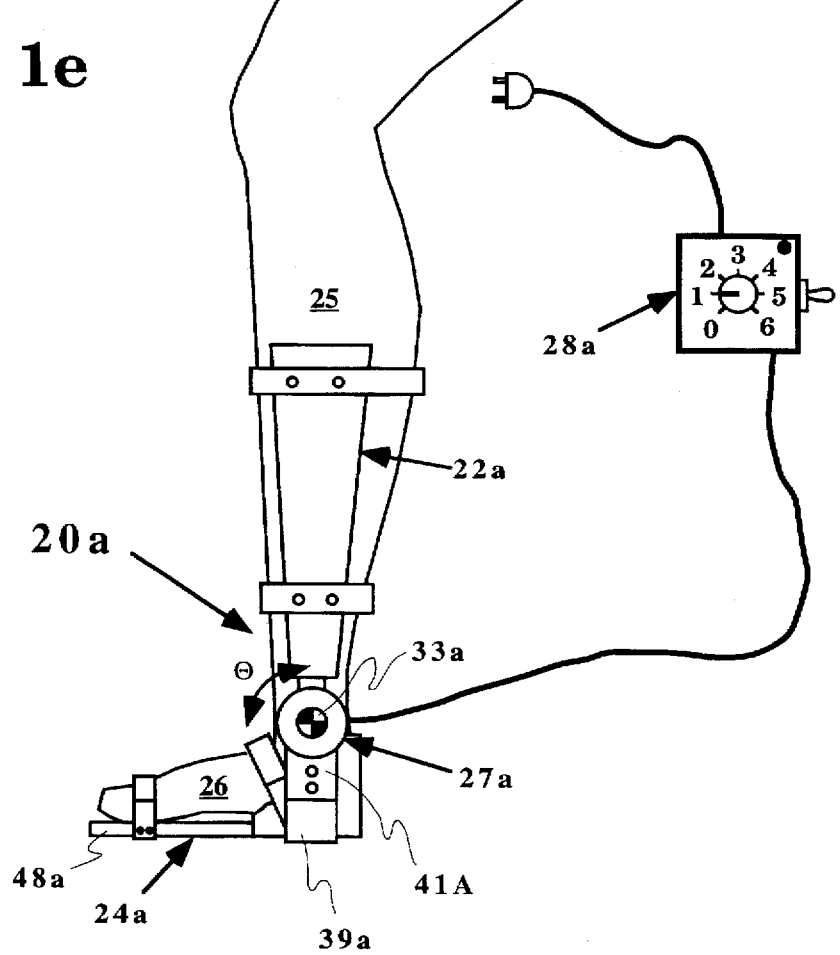
FIG. 1f is a side view of the first embodiment of a portable controllable fluid rehabilitation device shown attached between the patient's leg and foot for rehabilitation of the ankle joint about the Primary axis.

Referring now to the Drawings where like numerals denote like elements, as best shown in FIG. 1c and FIG. 1f, shown generally at 20a, is a first embodiment of portable controllable fluid rehabilitation device including, for example, a Magnetorheological (MR) braking device having therein a MR fluid comprising a carrier fluid and magnetic particles contained therein, for rehabilitative exercise of an ankle joint and the muscles associated therewith. In this embodiment, the same device can be used to rehabilitate an ankle joint 33a about two separate degrees of freedom.

The first degree of freedom is, for example, though an angle θ about a Primary axis "A—A" (shown in FIG. 1b) as described with reference to FIG. 1a and FIG. 1b. The second is through an angle φ about an Inversion/Eversion axis "B—B" as also shown in FIG. 1a and FIG. 1b. As will be described with reference to FIG. 2, FIG. 3, and FIG. 4a, it should be understood that the device may be used for rehabilitation of other joints, for example a wrist joint, an elbow joint, and a knee joint. Further, similar devices could be developed for hips and shoulder joints.

The device 20a of FIG. 1c provides resistance forces for rehabilitative exercise of muscles acting between a first body part, such as a lower leg 25 and a second body part, such as a foot 26, which are spaced apart on either side of a user's body joint 33a. The joint 33a is immobilized for certain degrees of freedom and only motion about a defined axis is exercised and rehabilitated. FIG. 1b illustrates motion of a joint 33a such as an ankle joint between a foot 26 and lower leg 25 which is about the Inversion/Eversion axis (motion about axis B—B in FIG. 1a) whereby flexing may occur through an angle φ about that same axis. It should be understood that the first embodiment of the device 20a can provide resistance forces to exercise and rehabilitate both the Inversion/Eversion axis and the Primary axis of an ankle joint, which are substantially perpendicular.

Again with reference to FIG. 1c, the portable rehabilitation device 20a is comprised of a first bracket 22a, a second bracket 24a and a controllable fluid brake 27a. The first bracket 22a includes means for fixedly securing said bracket 22a to a first body part, such as a lower leg 25. The means for securing can be comprised of straps 21a' and 21a" which may be manufactured of a fabric material having a VELCRO coupling element, a buckle, or the like attached thereto for allowing proper adjustment and securing to various-sized lower legs 25. The straps 21a' and 21a" are preferably attached to bracket 22a by rivets, bolts, adhesive or the like (FIG. 1f).

The second bracket 24a also includes means for fixedly securing to a second body part such as a foot 26. Again, the means for securing may be straps 23a' and 23a" which may be fabric straps including a VELCRO member, buckle, or the like for allowing adjustment and securing to different-sized feet 26 of the user.

The device 20a also includes a controllable fluid brake 27a attached between the first bracket 22a and the second bracket 24a. The controllable fluid brake 27a provides resistive forces about a defined axis A—A or B—B which as directly adjacent the body joint 33a. Which axis, i.e., degree of freedom, is exercised depends on the specific orientation of the device 20a. Orientation as shown in FIG. 1c exercises the Inversion/Eversion axis, whereas orientation as shown in FIG. 1f exercises the Primary axis. Resistance forces are applied by the brake 27a to exercise the muscles upon movement of the first bracket 22a relative to said second bracket 24a. Movement between the brackets 22a and 24a results from physical exercise and exertion by the user which causes movement of the first body part (the lower leg 25) relative to said second body part (the foot 26). Preferably, the device 27a is a rotary brake, and even more specifically, a controllable fluid device such as a magnetorheological fluid brake, as will be described in detail with reference to FIG. 5.

As shown in FIG. 1c and more clearly in enlarged and partially sectioned view FIG. 1d, the controllable fluid brake 27a includes a housing 35a and a shaft 43a. The brake 27a is preferably a MR fluid brake which has preferably contained therein a magnetically controlled fluid such as an MR which experiences a change in apparent viscosity when exposed to a magnetic field. The apparent change is viscosity provides the resistive torsional force between the shaft 43a and the housing 35a. The force (torque) exerted between the shaft 43a and housing 35a is proportional to the magnetic field applied to the magnetically controlled fluid. Therefore, by applying variable levels of magnetic field intensity, the level of resistance felt by the user may be varied immensely.

The first bracket 22a is generally comprised of leg brace 46a which has a contour which generally conforms to the contour of the leg 25 and a clevis bracket 45a attached to the leg brace 46a by way of fasteners such a screws, bolts, rivets, adhesive or the like. As shown in FIG. 1e, the clevis bracket 45a fits over the shaft 43a and clamps thereto by tightening a bolt 42a. Movement of the user's ankle about the Inversion/Eversion flexion causes rotation of the shaft 43a in FIG. 1c orientation. If a magnetic field is applied to the controllable fluid brake 27a, then torsional resistance is experienced by the user.

Again referring to FIG. 1c and FIG. 1d, the second bracket 24a is comprised of a foot brace 48a, a heel placement 37a, a swivel bracket 39a and a mounting bracket 41a. The mounting bracket 41a is rigidly attached to the housing 35a of the controllable fluid brake 27a by fasteners and slidably attached to the swivel bracket 39a such that the fasteners may be loosened to allow vertical adjustment to allow the brake 27a to be adjusted to various sized individuals. Swivel bracket 39a rotatably attaches to foot brace 48a by a swivel 49a. Swivel 49a allows rotation, yet may be locked when the correct position of the fluid brake 27a is determined, such that resistance to rotation from frictional engagement of the swivel bracket 39a and the foot brace 48a stops further rotation. Heel placement 37a, preferably made of plastic, attaches to the foot brace 48a by fasteners and functions to properly align the heel of the users foot 26 within the foot brace 48a.

The controller 28a preferably includes an adjustment to the resistance by way of dial 30a which controls, for example, a variable resistor. Various position settings 32a between 0 and 6 allow for increasing the level of resistance in increments. Cable 29a provides low voltage DC between 0–24 Volt DC, and preferably 12 Volt DC to the brake 27a. The level of current provided determines the intensity of the magnetic field generated inside the brake 27a and, thus, determines the resistance felt by the user. In this embodiment, the resistance can be adjusted to range between a low setting 0 where little resistance to movement is felt or experienced by the user to a higher setting 6 where the highest resistance is felt. Power is provided by plug 34a and cord 36a which are received from standard 110 Volt AC source, such as a wall electrical outlet. The device 20a includes an on-off switch 84a and an indicator 86a for indicating when the device is powered.

FIG. 1f illustrates the device 20a oriented for rehabilitation of the user's joint 33a about the Primary axis. In this orientation, the swivel bracket 39a, attached mounting bracket 41a and controllable fluid brake 27a are rotated relative to the foot brace 48a of first bracket 24a such that those elements face the side of the foot 26 and lower leg 25. Likewise, the first bracket 22a is repositioned on the side of leg 25.

Figure 2A:
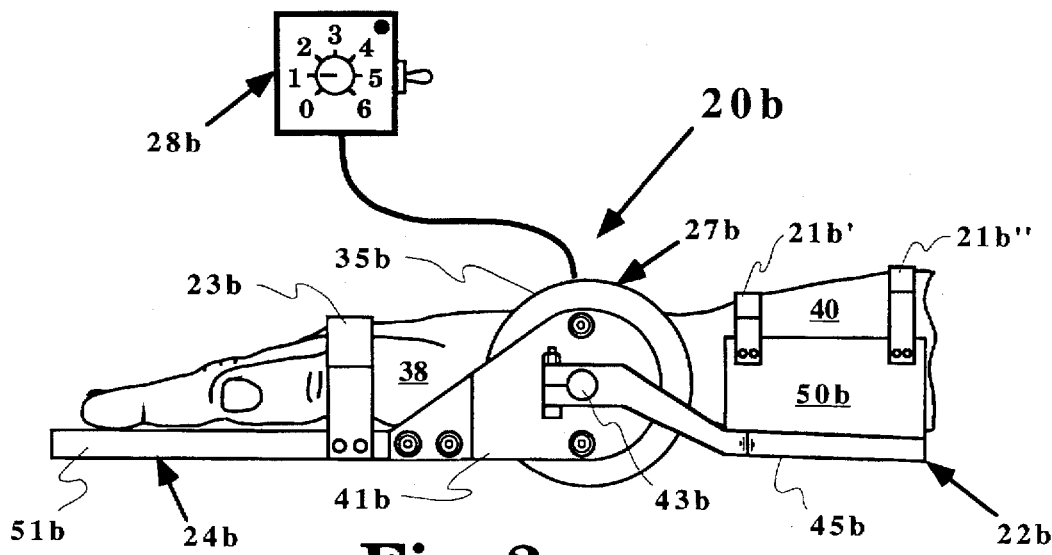
FIG. 2a is a side view of a battery-powered embodiment of portable controllable fluid rehabilitation device shown attached to a patient's hand and forearm for rehabilitation of the wrist joint.
Figure 2B:
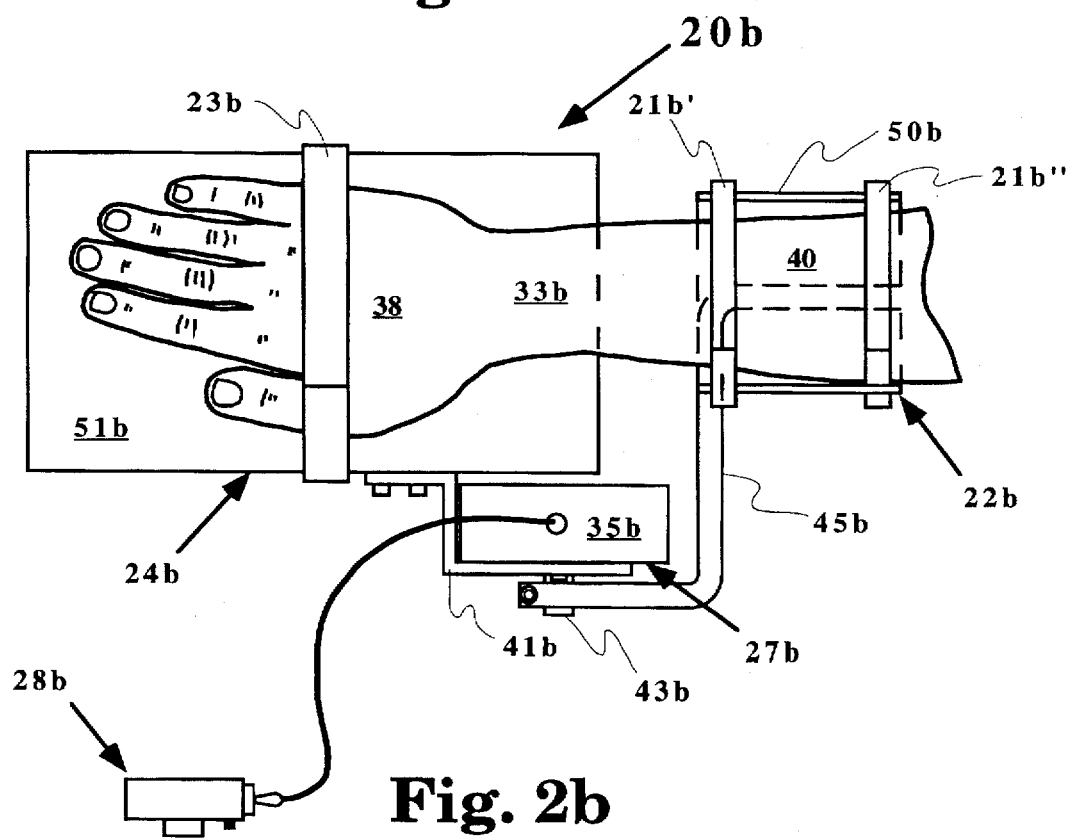

FIG. 2a and FIG. 2b illustrate another embodiment of portable controllable fluid rehabilitation device 20b for rehabilitative exercise of a wrist joint 33b. The device 20b is comprised of a first bracket 22b, second bracket 24b and a controllable fluid brake 27b attached therebetween. The first bracket 22b securely attaches to the forearm 40 of the user. The second bracket 24b attaches to the hand 38. The first bracket 22b is comprised of an arm brace 50b, clevis bracket 45b and straps 21b' and 21b". The clevis bracket 45b is secured to the shaft 43b of the brake 27b. Second bracket 24b is comprised of hand brace 51b, mounting bracket 41b and strap 23b. Housing 35b of brake 27b is secured to housing bracket 41b by fasteners or the like. The controller 28b is identical to the controller 28a of FIG. 1c embodiment except that the device 20b operates on battery power (for example 12 Volt, 9 Volt, 6 Volt, or D cell batteries) rather than 110 Volt AC. A schematic diagram of the controller 28a is described with reference to FIG. 6.

Figure 3:
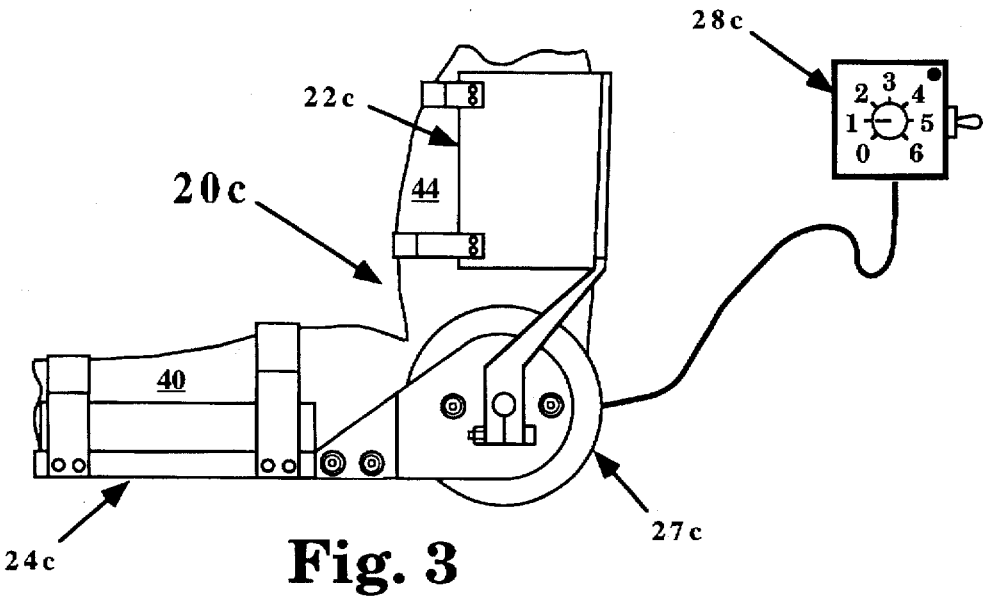
FIG. 3 is a side view of another embodiment of the portable controllable fluid rehabilitation device shown attached between a patient's forearm and upper arm for rehabilitation of the elbow joint.

FIG. 3 illustrates another embodiment of portable controllable fluid rehabilitation device 20c for rehabilitative exercise of an elbow joint. The device 20c is similar to that shown in FIG. 2a and FIG. 2b in that it includes a first bracket 22c, second bracket 22c and controllable fluid brake 27c, except the brackets 22c and 24c are appropriately sized to fit a user's forearm 40 and upper arm 44.

Figure 4A:
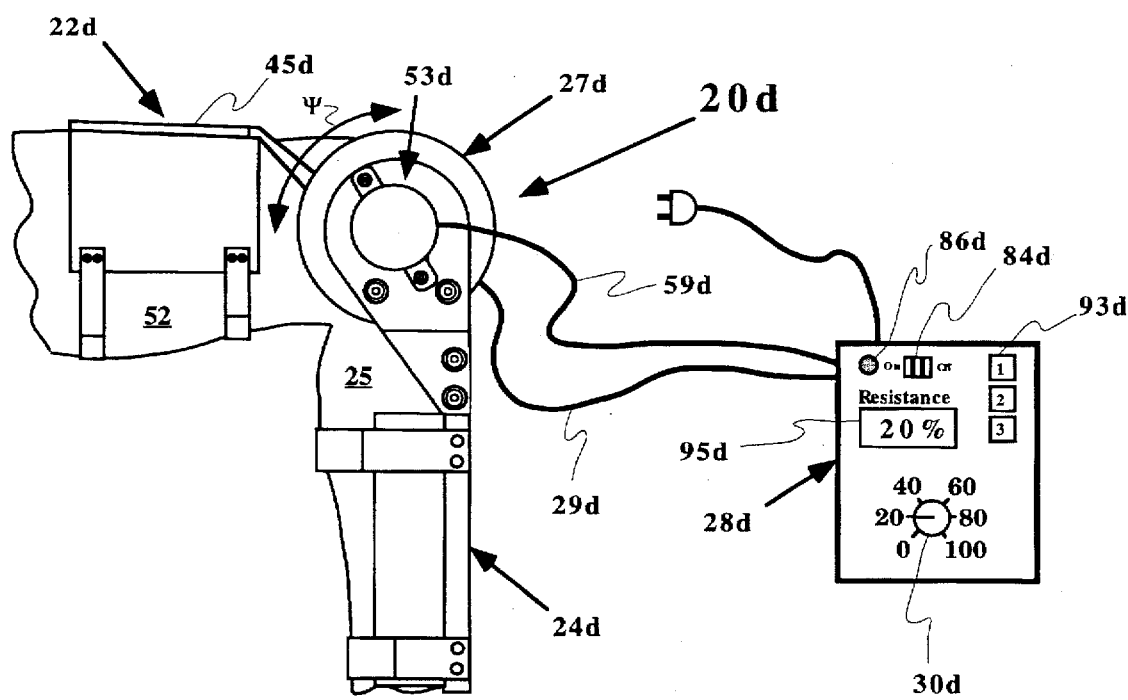
FIG. 4a is a side view of another embodiment of the portable controllable fluid rehabilitation device incorporating a position feedback unit and mode selection shown attached between a patient's upper leg and lower leg for rehabilitation of the knee joint.
Figure 4B:
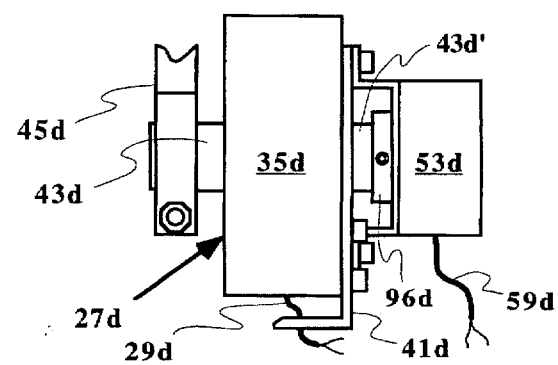
FIG. 4b is an enlarged side view of the brake and potentiometer used on the FIG. 4a embodiment of the portable controllable fluid rehabilitation device.

FIG. 4a and FIG. 4b illustrate another embodiment of portable controllable fluid rehabilitation device 20d for rehabilitative exercise of, for example, a knee joint. The device 20d is similar to that shown in FIG. 3 except the brackets 22d and 24d are appropriately sized to fit a user's lower leg 25 and upper leg 52. Also, in the FIG. 4a embodiment, the controller 28d is powered by 110 Volt AC and includes a digital signal processor (DSP) for processing feedback information from a position feedback device such as a potentiometer 53d. Rotary potentiometers are available from CTS Corp. (Models 511,518, 522, or 525) in Elkhart, Ind. The controller 28d includes an indicator 86d, such as an LED, for indicating when the device 20d is receiving power, and an on/off switch 84d, a mode selector 93d for selecting from various resistance profiles. A few possible profiles are described with reference to FIG. 7. Again referring to FIG. 4a and FIG. 4b, dial 30d is used to adjust the overall level of gain, and thus, the level of resistance experienced for any particular profile (example: mode 1, 2, or 3) selected. Three modes may be selected in this embodiment, however a multitude of modes may be stored. A readout 95d displays the percentage of maximum resistance for each profile. By adjusting the dial 30d, the user can adjust the level of resistance for each profile or mode selected. Cable 59d provides electrical signals to the controller indicative of rotational position of the potentiometer 53d. Cable 29d carries the current from a current driver in the controller 28d to the brake 27d.

FIG. 4b illustrates an enlarged side view of the brake 27d and the potentiometer 53d. Shaft 43d of brake 27d attaches to clevis bracket 45d. Housing 35d is attached to the mounting bracket 41d. Potentiometer 53d attaches to shaft extension 43d' via coupler 96d and information indicative of rotation of shaft extensions 43d' is relayed to controller 28d via cable 59d for processing thereby. In this fashion, the device 20d may be controlled to vary the resistance force as a function of rotation angle $\psi$ between the brackets 22d and 24d.

Figure 5A:
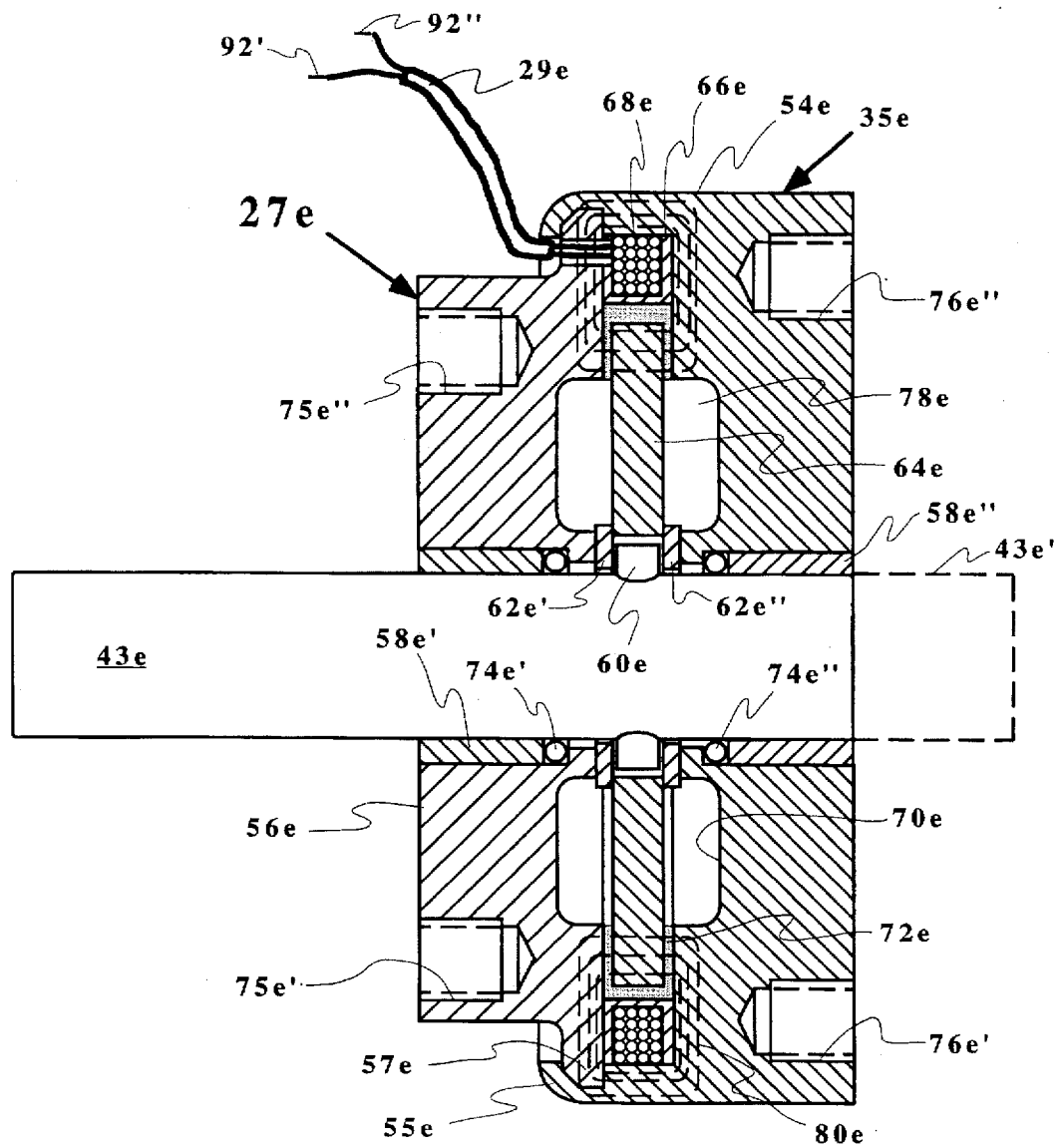
FIG. 5a is a cross-sectional view of a rotary magnetorheological brake for providing variable resistive forces between the brackets.
Figure 5B:
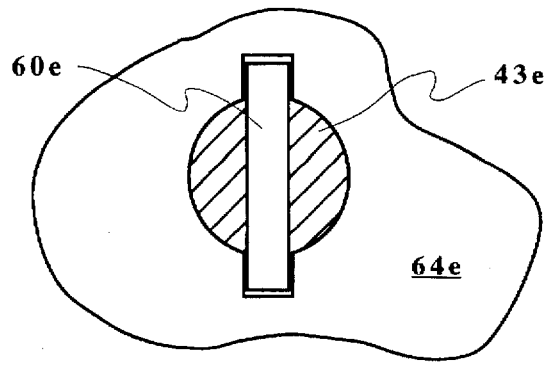
FIG. 5b is a partially cross-sectioned end view illustrating the pin received within cross-drilled shaft and recess in rotor.

FIG. 5a illustrates an embodiment of a controllable fluid brake 27e for use in the portable controllable fluid rehabilitative device 20a, 20b, 20c and 20d (FIGS. 1c, 2a, 3, and 4a). The brake 27e is comprised of a housing 35e, a shape 43e rotatably received within said housing 35e, and bearings 58e' and 58e" which are bushing-like which support the shaft 43e. The housing 35e includes a first half 54e and second half 56e which are secured together by bending crimp 55e over onto tab 57e about the periphery. A disc 64e is slidably received on shaft 43e and a pin 60e is received through a hole cross-drilled in shaft 43e and also received within a recesses formed in disc 64e to prevent rotation of the shaft 43e relative to the disc 64e as shown in partial view of FIG. 5b. Flat washers 62e' and 62e" maintain the proper gap between the disc 64e and the first and second halves 54e and 56e. Washers 62e' and 62e" control axial play, but do not appreciably affect rotation. They may be coated with a friction reducing material such as TEFLON. The first and second halves 54e and 56e are preferably manufactured from a high magnetic permeability material, such as low carbon steel. The Flat washers 62e' and 62e" are preferably nonmagnetic, low permeability materials, such as nylon. The shaft 43e is preferably non-magnetic also.

While operatively rotating, preferably contained within the gaps between the housing 35e and the disc 64e is a magnetically controlled fluid 72e which undergoes a change in apparent viscosity upon being exposed to a magnetic field 80e. One desirable fluid 72e is a magnetorheological fluid.

Magnetorheological fluids are fully described in commonly assigned U.S. Pat. No. 5,382,373, to Carlson et al., entitled "Magnetorheological Materials based on Alloy Particles" which is hereby incorporated by reference herein. The fluid 72e is contained within the cavity 78e formed by two halves 54e and 56e and shaft 43e. Seals 74e' and 74e" prevent the escape of fluid from the brake 27a. Seals 74e' and 74e" may be o-ring, lip seals or the like. Pockets 70e are formed in the halves 54e and 56e and the cavity 78e to focus the magnetic field 80e at the outermost region of the disc 64e (the magnetic field is shown as dotted lines 80e). The distribution of the fluid 72e is shown as it would be if the shaft 43e were being rotated. Residual magnetic attraction forces would generally keep the fluid 72e in place in the gap even after the power to the brake 27e is turned off. After long period of non-use, the brake 27e should be rotated through large rotational angles, before use, to properly disburse the fluid 72e within the gaps, should any settling have occurred. A wire, such as coated copper wire or the like, is wound about a bobbin 66e, which is preferably nonmagnetic material such as plastic or other polymeric material, a number of times (approx. 100 winds or more) to form coil 68e. The bobbin 66e also acts to seal the halves 54e and 56e to prevent fluid 72e from escaping at that juncture.

Energizing the coil 68e, preferably with a current between 0.0 and 1.0 AMP will cause a magnetic field 80e to be formed which causes the change in apparent viscosity of the fluid 72e contained in the gaps. This causes resistance to rotation of the disc 64e relative to the housing 35e. Varying the level of current i in the coil 68e will vary the degree of change is apparent viscosity and will cause varying level of torsional resistance between the disc 64e and the housing 35e. The threaded holes 75e', 75e", 76e', and 76e" allow attachment to various brackets in various different orientations. Further, if a potentiometer 53d were used, such as in the FIG. 4a embodiment, an extended shaft 43e' would be used (extension portion is shown as dotted). Current is received in the brake through cable 20e having incoming lead 92' and outgoing lead 92".

Figure 6:
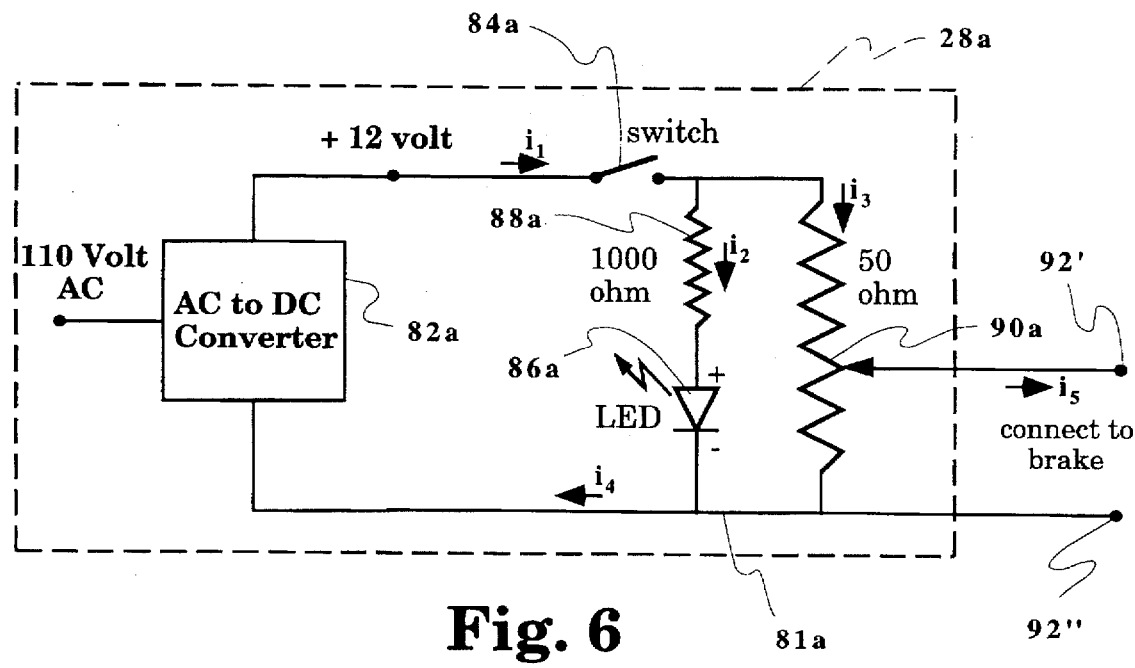
FIG. 6 is electrical schematic of a controller for varying the force provided by the controllable fluid brake.

FIG. 6 illustrates an electrical schematic of, for example the controller 28a used in conjunction with the device 20a. The controller 28a is comprised of an AC to DC converter 82a to convert standard 110 Volt AC, such as from an electrical outlet to 12 volt DC. An indicator 86a such as an LED is placed in series relationship with a resistor 88a of preferably 1000 ohm, thereby causing the indicator 86a to light when the switch 84a (shown open) is throw to the On position (closed). In parallel electrical relationship with the branch including the resistor 88a and indicator 86a is a voltage divider 90a which has a maximum resistance value of approximately 50 ohm. Changing the position of the voltage divider 90a will change the resistance, and thus, change the current $i_s$ approximately according to the relationship: V=Ri. Leads 92' and 92" of circuit 81a attach to the controllable fluid brake 27a at leads 92e' and 92e" of the brake 27e as shown in FIG. 5. Alternatively, a DC 12 Volt battery may be used to power the device 20a as is shown in FIG. 2. In this type of battery powered embodiment, the AC to DC converter 82a is not needed. A battery powered system would include, for example, a Nickel Cadmium battery, made by SPC Technology Model #BT-210 or a lead acid battery from Yuasa/Exide in Reading, Pa., Model # NPO 0.8-12. For certain applications, a 9 Volt battery could be used, such as the Model CH22 manufactured by EVEREADY or the NC1604 manufactured by DURACELL.

Figure 7:
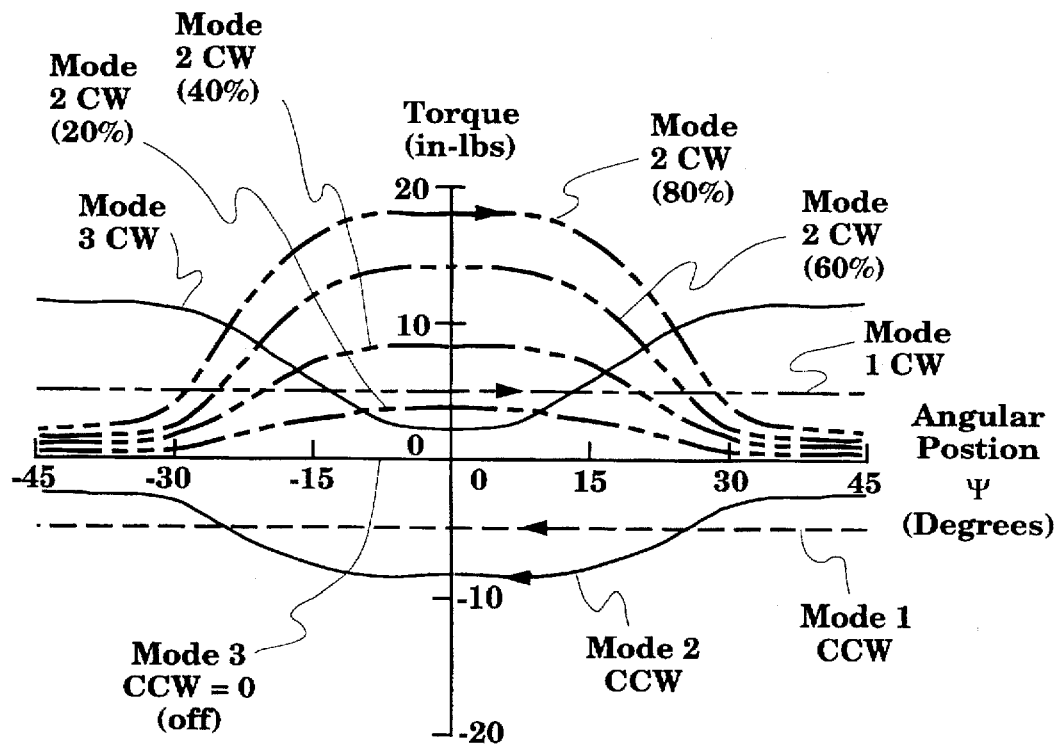
FIG. 7 is graphical plot of the various desirable force output modes as a function of position for the portable controllable fluid rehabilitation device.

FIG. 7 illustrates graphical plots of various performance curves that may be desirable. For example, if the device 20d, such as in FIG. 4a, includes a controller 28d including a microprocessor and feedback of rotational position information from a potentiometer 53d, then implementation of various force (torque) profiles is possible. For instance, the device 20d may be commanded to Mode 1. In Mode 1, a positive torque of about 5 in-lb is commanded independent of angular position Ψ in both the Clock Wise (CW) and Counter Clock Wise (CCW) directions of rotation. In Mode 2, the torque, i.e., resistance force increases as the angular position Ψ approaches zero degrees. Zero degrees would coincide with the midrange of the user's motion, such that maximum resistance would be encountered at the center of the range of motion, with smaller resistance values experienced at the limits of motion.

For any particular mode, for example Mode 2, the user would be able to set the percentage resistance between 0% and 100%. Mode 2 CW (80%, 60%, 40%, and 20%) illustrates the range or family of performance curves that are selectable by the user. In this way, the user can progressively increase the level of resistance for any particular mode selected. Mode 2 CCW illustrates that a smaller level of resistance can be commanded for CCW rotations as opposed to CW rotations, if desired. Mode 3 CW illustrates that a smaller level of resistance can be commanded to occur at zero angular position and larger values at the end of the stroke, if desired. Mode 3 CCW shows zero torque on the return stroke may be commanded. Persons of ordinary skill in the art would recognize that other force profile variants are possible. The performance profile would be stored in a look-up table, or encoded as a continuous function algorithm, with corresponding voltage values associated with each angular position Ψ. Different modes would have different values associated therewith stored in the table. Based upon the position of the brake and the mode selected, a specific voltage value would be commanded. That voltage value could then be adjusted from 100% to 0%, as desired by the user.

Figure 8:
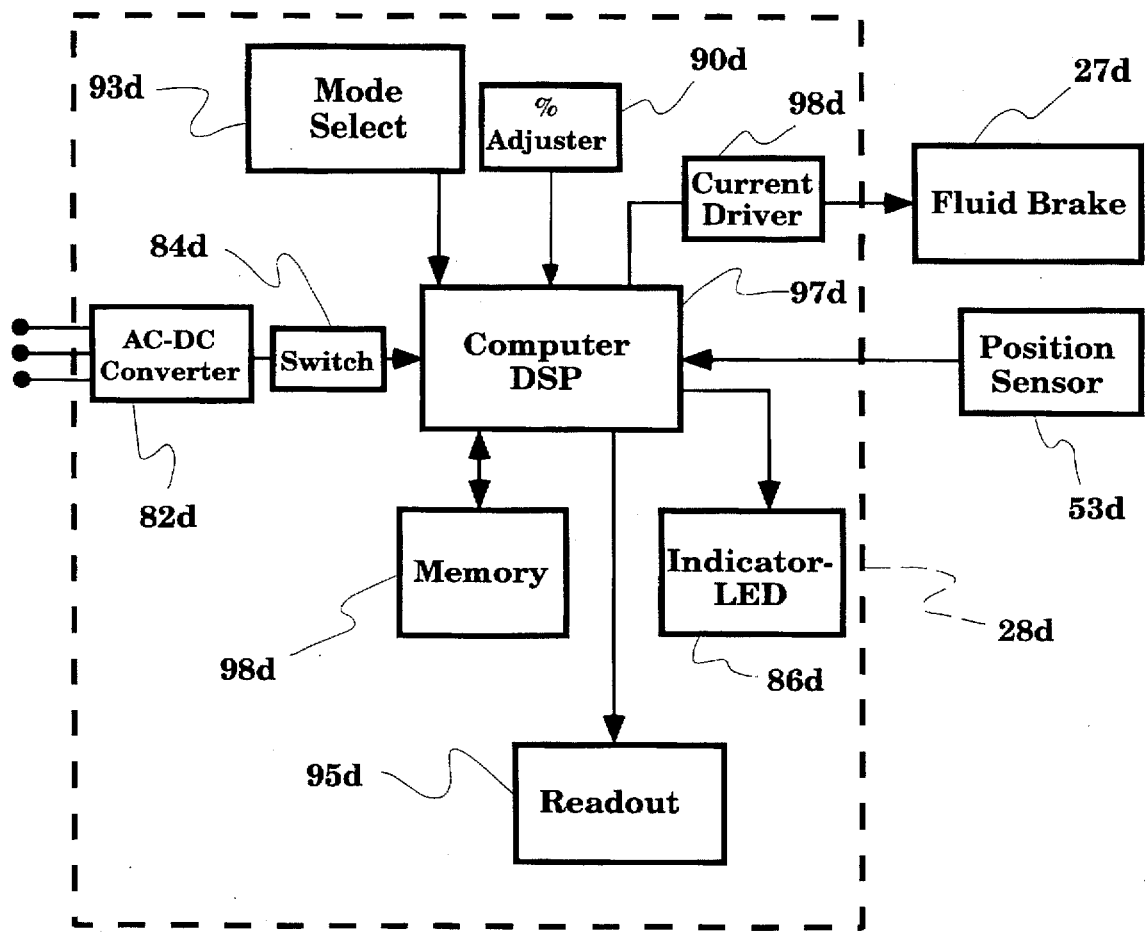
FIG. 8 is a block schematic of a controller for varying the force provided by the controllable fluid brake according to feedback information and mode setting information.

FIG. 8 illustrates a block diagram of a controller 28d for the device 20d shown in FIG. 4a. Likewise, the controller 28d could be used on any device 20d which uses feedback information to control force output from the brake 27d. The controller 28d includes an AC-DC converter 82d for supplying DC power for powering the various elements in the system. The controller 28d further includes an on-off switch 84d, a computer, microprocessor or digital signal processor (DSP) 97d for performing any signal processing, operations or calculations that are required, mode settings 93d for selecting the various mode profiles (example 1, 2, 3) of exercise desired, a memory component 98d where the profiles are stored in lookup table form, an indicator light 86d such as an LED, for indicating when the device 20d is powered, a current driver 98d for driving the controllable fluid brake 27d, and a percent (%) adjuster 90d, such as a variable resistor, for adjusting the percent (%) of maximum output commanded by the computer 97d that is desired by the user, a readout 95d, preferably digital, is used to indicate the level (%) of maximum commanded output desired and position sensor 53d provides feedback information to the DSP 97d regarding, for example, rotational position of a rotary brake 27d. For the selected mode setting 93d, the computer 97d would then extract from the memory 98d, the appropriate voltage value to command to the driver 98d. This voltage value can then be adjusted appropriately by the adjuster to the level of % resistance desired by the user.

In summary, the present invention is a portable controllable fluid rehabilitation device for providing resistive forces for rehabilitative exercise of muscles acting between a first body part and a second body part which are spaced on either side of a body joint, comprising a first bracket having means for fixedly securing to said first body part, a second bracket having means for fixedly securing to said second body part and a controllable fluid brake attached therebetween. The controllable fluid brake provides resistance forces about a defined axis adjacent the body joint to exercise the desired muscles associated with said body joint. The brake is preferably a rotary controllable fluid brake which incorporates a magnetically controlled fluid including a carrier fluid and magnetic particles. Also, preferably, the device includes a controller whereby the user can adjust the level of resistance experienced. In one embodiment, the resistance forces are varied according to a predetermined profile as a function of position feedback information derived from a potentiometer.

While the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A portable controllable fluid rehabilitation device for providing resistive forces for rehabilitative exercise of muscles acting between a first body part and a second body part which are spaced on either side of a body joint, comprising:

(a) first bracket means for fixedly securing to said first body part;
   (b) second bracket means for fixedly securing to the second body part; and
   (c) a controllable fluid brake housing a magnetically controlled fluid, said controllable fluid brake attaching between said first bracket and said second bracket and providing resistance forces about a defined axis adjacent to the body joint to exercise the muscles upon movement of said first bracket relative to said second bracket, said movement resulting from movement of the first body part relative to the second body part, said controllable fluid brake further comprising a housing having first and second halves fixedly secured together, said housing including an magnetically-soft outer peripheral flux path and a recessed portion, a shaft having a rotor mounted thereon, said rotor being received within said recessed portion and forming a gap on either side of said rotor which contains said magnetically controlled fluid, and a circumferentially wound coil adjacent said rotor and located radially inward from said outer peripheral flux path, said coil generating a magnetic field which is carried by said outer peripheral flux path and across said gaps.

2. A portable controllable fluid rehabilitation device of claim 1 wherein said magnetically controlled fluid is a magnetorheological fluid further comprising a carrier fluid and disbursed particles and which exhibits a change in apparent viscosity when exposed to a magnetic field, thus providing said resistance forces.

3. A portable controllable fluid rehabilitation device of claim 1 wherein said controllable fluid brake is a rotary magnetorheological fluid brake which provides rotary resistance forces and exercises one body joint selected from the group consisting of:

(a) a wrist joint where said first bracket means is further comprised of a clevis bracket clamped to said shaft and an arm brace which is secured to a user's forearm and said second bracket means is further comprised of a mounting bracket rigidly attached to said housing and a hand brace secured to the user's hand,
   (b) an elbow joint where said first bracket means is further comprised of a clevis bracket clamped to said shaft and a upper arm brace secured to a user's upper arm and said second bracket means is further comprised of a mounting bracket rigidly attached to said housing and a forearm brace secured to the user's forearm,
   (c) a knee joint where said first bracket means is further comprised of a clevis bracket clamped to said shaft and a upper leg brace secured to a user's upper leg and said second bracket means is further comprised of a mounting bracket rigidly attached to said housing and a lower leg brace secured to the user's lower leg, and
   (d) an ankle joint where said first bracket means is further comprised of a clevis bracket clamped to said shaft and a lower leg brace secured to a user's lower leg and said second bracket means is further comprised of a mounting bracket rigidly attached to said housing and a foot brace secured to the user's foot.

4. A portable controllable fluid rehabilitation device of claim 1 wherein said controllable fluid brake is a rotary brake which attaches between said first bracket means and said second bracket means and which provides rotary resistance forces to exercise an ankle joint having a Primary axis and a substantially perpendicular Inversion/Eversion axis about both the Primary axis and the Inversion/Eversion axis by allowing repositioning of an orientation of said first bracket means relative to said second bracket means via a swivel mechanism.

5. A portable controllable fluid rehabilitation device of claim 1 which further includes a controller unit for allowing a user to variably adjust the amount of resistance forces applied by said controllable fluid brake between said first bracket means and said second bracket means.

6. A portable controllable fluid rehabilitation device of claim 5 which is powered by battery provided low voltage DC.

7. A portable controllable fluid rehabilitation device of claim 5 wherein said controllable fluid brake is controlled by a controller which generates an output signal to said controllable fluid brake to cause a rheology change in a controllable fluid housed in said controllable fluid brake to provide variable resistive forces between said first bracket means and said second bracket means which vary according to a predetermined torque profile which is determined by said controller and which varies as a function of rotary position supplied from a sensor.

8. A portable controllable fluid rehabilitation device of claim 7 wherein said controller receives feedback information regarding rotary position from a rotary potentiometer attached between said housing and said shaft.

9. A portable controllable fluid rehabilitation device for providing resistive forces for rehabilitative exercise of muscles acting between a first body part and a second body part which are spaced on either side of a body joint, comprising:

(a) a first bracket means for fixedly securing to the first body part thereto;
   (b) a second bracket means for fixedly securing to the second body part thereto; and
   (c) a magnetorheological fluid rotary brake having a magnetorheological fluid contained therein attached between said first bracket means and said second bracket means, said magnetorheological fluid rotary brake providing rotary resistive forces about a defined axis adjacent to the body joint to exercise the muscles upon movement of said first bracket relative to said second bracket resulting from movement of the first body part relative to the second body part, said controllable fluid brake further comprising a housing having first and second halves fixedly secured together, said housing including an magnetically-soft outer peripheral flux path and a recessed portion, a shaft having a rotor mounted thereon, said rotor being received within said recessed portion and forming a gap on either side of said rotor which contains said magnetically controlled fluid, and a circumferentially wound coil adjacent said rotor and located radially inward from said outer peripheral flux path, said coil generating a magnetic field which is carried by said outer peripheral flux path and across said gaps.

10. A portable controllable fluid rehabilitation device for providing resistive forces for rehabilitative exercise of muscles acting between a first body part and a second body part which are spaced on either side of a body joint, comprising:

(a) a first bracket means for fixedly securing to the first body part thereto;

(b) a second bracket means for fixedly securing to the second body part thereto;

(c) a magnetorheological fluid rotary brake attached between said first bracket means and said second bracket means, said magnetorheological fluid rotary brake providing resistive forces about a defined axis adjacent to the body joint to exercise said muscles upon movement of said first bracket means relative to said second bracket means resulting from movement of the first body part relative to the second body part, said controllable fluid brake further comprising a housing having first and second halves fixedly secured together, said housing including an magnetically-soft outer peripheral flux path and a recessed portion, a shaft having a rotor mounted thereon, said rotor being received within said recessed portion and forming a gap on either side of said rotor which contains said magnetically controlled fluid, and a circumferentially wound coil adjacent said rotor and located radially inward from said outer peripheral flux path, said coil generating a magnetic field which is carried by said outer peripheral flux path and across said gaps; and (d) a controller for allowing variable adjustment of said resistive forces applied between a high level and a low level.

11. A portable controllable fluid rehabilitation device for providing resistive forces for rehabilitative exercise of muscles acting between a first body part and a second body part which are spaced on either side of a body joint, comprising:

(a) a first bracket means for fixedly securing to the first body part thereto;

(b) a second bracket means for fixedly securing to the second body part thereto;

(c) a magnetorheological fluid rotary brake attached between said first bracket means and said second bracket means, said magnetorheological fluid rotary brake providing resistive forces about a defined axis adjacent the body joint to exercise the muscles upon movement of said first bracket means relative to said second bracket means resulting from movement of the first body part relative to the second body part, said controllable fluid brake further comprising a housing having first and second halves fixedly secured together, said housing including an magnetically-soft outer peripheral flux path and a recessed portion, a shaft having a rotor mounted thereon, said rotor being received within said recessed portion and forming a gap on either side of said rotor which contains said magnetically controlled fluid, and a circumferentially wound coil adjacent said rotor and located radially inward from said outer peripheral flux path, said coil generating a magnetic field which is carried by said outer peripheral flux path and across said gaps; and (d) a controller for allowing variable percentage adjustment of said resistive forces applied between a high percentage of resistance and a low percentage of resistance and which also vary according to a predetermined profile which varies torque as a function of position between said first bracket means and said second bracket means.

* * * * *